United States Patent
Lomet et al.

(10) Patent No.: US 8,868,514 B2
(45) Date of Patent: Oct. 21, 2014

(54) TRANSACTION SUPPORT FOR DISTRIBUTED DATA

(75) Inventors: David Lomet, Redmond, WA (US); Mohamed Mokbel, New Brighton, MN (US); Justin Levandoski, Minneapolis, MN (US); Keliang Zhao, San Diego, CA (US)

(73) Assignee: Microsoft Corporation, Redmond, WA (US)

( * ) Notice: Subject to any disclaimer, the term of this patent is extended or adjusted under 35 U.S.C. 154(b) by 387 days.

(21) Appl. No.: 12/986,962

(22) Filed: Jan. 7, 2011

(65) Prior Publication Data

US 2012/0179645 A1 Jul. 12, 2012

(51) Int. Cl.
G06F 7/00 (2006.01)
G06F 17/00 (2006.01)
G06F 15/16 (2006.01)

(52) U.S. Cl.
USPC .......................... 707/682; 707/607; 707/648

(58) Field of Classification Search
CPC ............ G06F 11/1471; G06F 11/1474; G06F 17/30377
USPC ......................... 707/682, 607, 648
See application file for complete search history.

(56) References Cited

U.S. PATENT DOCUMENTS

| | | | |
|---|---|---|---|
| 5,123,104 A * | 6/1992 | Levine et al. .......... | 707/999.001 |
| 5,247,672 A | 9/1993 | Mohan | |
| 5,781,910 A * | 7/1998 | Gostanian et al. ............ | 707/703 |
| 5,870,758 A * | 2/1999 | Bamford et al. ....... | 707/999.008 |
| 7,065,537 B2 | 6/2006 | Cha et al. | |
| 7,305,421 B2 | 12/2007 | Cha et al. | |
| 7,426,559 B2 | 9/2008 | Hamel et al. | |
| 2003/0061537 A1 * | 3/2003 | Cha et al. ......................... | 714/16 |
| 2003/0208464 A1 * | 11/2003 | Lee et al. ............... | 707/999.001 |
| 2004/0260726 A1 | 12/2004 | Hrle et al. | |
| 2007/0239758 A1 * | 10/2007 | Devine et al. .......... | 707/999.102 |
| 2009/0240664 A1 * | 9/2009 | Dinker et al. ..................... | 707/3 |
| 2010/0030818 A1 * | 2/2010 | Cooper et al. ................ | 707/201 |
| 2010/0191713 A1 | 7/2010 | Lomet et al. | |
| 2011/0179000 A1 * | 7/2011 | Shaughnessy ................ | 707/703 |

OTHER PUBLICATIONS

Randy Chow and Theodore Johnson. Distributed Operating Systems and Algorithms. Addison Wesley Longman, Inc., Reading, Massachusetts, 1997, Title Pages, Preface and Sections 4.3, 6.3 and 12.1, pp. ii, iii, vii-xii, 123-127, 207-218 and 425-452.*

(Continued)

*Primary Examiner* — Greta Robinson
*Assistant Examiner* — Brian E. Weinrich
(74) *Attorney, Agent, or Firm* — Steve Wight; Carole Boelitz; Micky Minhas (57) ABSTRACT

A distributed system with transaction support may have a transaction component and one or more data components. The transaction component may manage a transaction using a log sequence number for each operation, and then transmit operations to one or more data components with log sequence numbers. The data components may perform the data operations in an idempotent manner and return a reply. The transaction component may then write the operation, its log sequence number, and information from the reply message to its log. The transaction component is able to commit a transaction, as well as retry or undo portions of a transaction, by using the information stored on its log. This may be possible even when a single transaction uses multiple data components, which may be located on different devices or manage separate and independent data sources.

20 Claims, 5 Drawing Sheets

(56) References Cited

OTHER PUBLICATIONS

Sears, et al., "Segment-Based Recovery: Write-Ahead Logging Revisited", Retrieved at << http://www.vldb.org/pvldb/2/vldb09-583.pdf >>, VLDB, Aug. 24-28, 2009, pp. 12.

Lomet, et al., "Logical Logging To Extend Recovery To New Domains", Retrieved at << http://www.markrtuttle.com/papers/lt99-sigmod.pdf >>, International Conference on Management of Data and Symposium on Principles of Database Systems, May 31-Jun. 3, 1999, pp. 12.

Barga, et al., "Improving Logging and Recovery Performance in Phoenix/App—Published Date: 2004", Retrieved at << http://citeseerx.ist.psu.edu/viewdoc/download;jsessionid=FBA3928EB4FE8C007A31816069BDFA0D?doi=10.1.1.72.140&rep=rep1&type=pdf >>, Proceedings of the 20th International Conference on Data Engineering, 2004, pp. 12.

Aguilera, et al., "Sinfonia: A New Paradigm for Building Scalable Distributed Systems", Retrieved at << http://www.hpl.hp.com/personal/Mehul_Shah/papers/sosp_2007_aguilera.pdf >>,SOSP, Oct. 14-17, 2007, pp. 16.

"Amazon SimpleDB", Retrieved at << http://aws.amazon.com/simpledb/ >>, Retrieved Date : Sep. 23, 2010, pp. 7.

Barga, et al., "Recovery Guarantees for Internet Applications", Retrieved at << http://citeseerx.ist.psu.edu/viewdoc/download-?doi=10.1.1.6.450&rep=rep1&type=pdf >>, ACM Transactions on Internet Technology, vol. 4 No. 3, Aug. 2004, p. 1-42.

Hamilton, James, "Perspectives", Retrieved at << http://perspectives.mvdirona.com/2008/07/10/GoogleMegastore.aspx >>, Jul. 10, 2008, pp. 5.

Brantner, et al., "Building a Database on S3", Retrieved at << http://citeseerx.ist.psu.edu/viewdoc/download?doi=10.1.1.141.5679&rep=rep1&type=pdf >>, International Conference on Management of Data, Jun. 9-12, 2008, p. 251-263.

Brewer, Dr. Eric A., "Towards Robust Distributed Systems", Retrieved at << http://www.cs.berkeley.edu/~brewer/cs262b-2004/PODC-keynote.pdf >>, Jul. 19, 2000, pp. 12.

Chang, et al., "Bigtable: A Distributed Storage System for Structured Data", Retrieved at << http://static.googleusercontent.com/external_content/untrusted_dlcp/labs.google.com/en//papers/bigtable-osdi06.pdf >>, In Proceedings of the 7th Conference on USENIX Symposium on Operating Systems Design and Implementation, vol. 7, 2006, p. 1-14.

Cooper, et al., "PNUTS: Yahoo!'s hosted Data Serving Platform", Retrieved at << http://citeseerx.ist.psu.edu/viewdoc/download-?doi=10.1.1.141.68&rep=rep1&type=pdf >>, VLDB, Aug. 24-30, 2008, pp. 12.

Das, et al., "ElasTraS: An Elastic Transactional Data Store in the Cloud", Retrieved at << http://www.usenix.org/event/hotcloud09/tech/full_papers/das.pdf >>, Proceedings of the conference on Hot topics in cloud computing, 2009, pp. 5.

Das, et al., "G-Store: A Scalable Data Store for Transactional Multi-Key Access in the Cloud", Retrieved at << http://www.cs.ucsb.edu/~sudipto/papers/socc10-das.pdf >>, Workshop on Cloud Computing in conjunction with SIGMOD, Jun. 10-11, 2010, pp. 12.

DeCandia, et al., "Dynamo: Amazon's Highly Available Key-value Store", Retrieved at << http://s3.amazonaws.com/AllThingsDistributed/sosp/amazon-dynamo-sosp2007.pdf >>, 21st Symposium on Operating Systems Principles, Oct. 14-17, 2007, p. 205-220.

Gilbert, et al., "Brewer's Conjecture and the Feasibility of Consistent, Available, Partition-tolerant Web Services", Retrieved at << http://citeseerx.ist.psu.edu/viewdoc/download?doi=10.1.1.67.6951&rep=rep1&type=pdf >>, ACM SIGACT News, vol. 33 No. 2, Jun. 2002, pp. 12.

"Hbase", Retrieved at << http://hbase.apache.org/ >>, Aug. 13, 2010, pp. 3.

Kossmann, et al., "An Evaluation of Alternative Architectures for Transaction Processing in the Cloud", Retrieved at << http://citeseerx.ist.psu.edu/viewdoc/download?doi=10.1.1.169.2041&rep=rep1&type=pdf >>, International Conference on Management of Data, Jun. 6-11, 2010, pp. 12.

Kraska, et al., "Consistency Rationing in the Cloud: Pay only when it Matters", Retrieved at << http://www.dbis.ethz.ch/research/publications/ConsistencyRationing.pdf >>, VLDB, Aug. 24-28, 2009, pp. 12.

Lomet, et al., "Unbundling Transaction Services in the Cloud", Retrieved at << http://research.microsoft.com/pubs/81294/CIDR-final.pdf >>, 4th Biennial Conference on Innovative Data Systems Research, Jan. 4-7, 2009, p. 1-10.

Lomet, et al., "Locking Key Ranges with Unbundled Transaction Services", Retrieved at << http://research.microsoft.com/pubs/81295/Part-Lock.pdf >>, VLDB, Aug. 24-28, 2009, pp. 12.

"Microsoft Windows Azure", Retrieved at << http://www.microsoft.com/windowsazure/windowsazure/ >>, Retrieved Date : Sep. 23, 2010, pp. 3.

"Microsoft Common Log File System", Retrieved at << http://tinyurl.com/2fwlmux >>, Retrieved Date : Sep. 23, 2010, pp. 2.

Mohan, et al., "ARIES: A Transaction Recovery Method Supporting Fine-Granularity Locking and Partial Rollbacks Using Write-Ahead Logging", Retrieved at << http://citeseerx.ist.psu.edu/viewdoc/download?doi=10.1.1.87.5361&rep=rep1&type=pdf >>, ACM Transactions on Database Systems, vol. 17, No. 1, Mar. 1992, p. 94-162.

"TPC-W Benchmarks", Retrieved at << http://www.tpc.org/tpcw/ >>, Retrieved Date : Sep. 23, 2010, pp. 2.

Vo, et al., "Towards Elastic Transactional Cloud Storage with Range Query Support", Retrieved at << http://www.comp.nus.edu.sg/~ooibc/vldb10-ecstore.pdf >>, Proceedings of the VLDB Endowment, vol. 3, No. 1, Sep. 13-17, 2010.

Vogels, Werner, "Data Access Patterns in the Amazon.com Technology Platform", Retrieved at << http://www.vldb.org/conf/2007/papers/special/p1-vogels.pdf >>, VLDB Endowment, Sep. 23-28, 2007, p. 1.

"Eventually Consistent", Retrieved at << http://delivery.acm.org/10.1145/1470000/1466448/p14-vogels.pdf?key1=1466448&key2=4311225821&coll=GUIDE&dl=GUIDE&CFID=105694312&CFTOKEN=81275856 >>, Oct. 2008, p. 14-19.

Wei, et al., "Scalable Transactions for Web Applications in the Cloud", Retrieved at << http://citeseerx.ist.psu.edu/viewdoc/download;jsessionid=814E0D113EEA504CC4A9FA1CDEF636CD?doi=10.1.1.148.4519&rep=rep1&type=pdf >>, Proceedings of the 15th International Euro-Par Conference on Parallel Processing, 2009, pp. 12.

Wei, et al., "CloudTPS: Scalable Transactions for Web Applications in the Cloud", Retrieved at <<http://www.globule.org/publi/CSTWAC_ircs53.pdf >>, Feb. 15, 2010, p. 1-44.

* cited by examiner

TRANSACTION SUPPORT FOR DISTRIBUTED DATA

BACKGROUND

A transaction may be a unit of work performed within a data processing system (or similar system), which may be treated in a coherent and reliable way independent of other transactions. A transaction may be atomic, consistent, isolated and durable, and may be an enabling technology for many complex applications, such as credit card transactions, airline reservations, and the like.

Transactions may provide an "all-or-nothing" proposition, stating that each work-unit performed may either complete in its entirety or have no effect whatsoever. Further, the system may isolate each transaction from other transactions, results may conform to existing constraints, and transactions that complete successfully may get written to durable storage.

Conventional transaction systems may limit the scope of a transaction, as transaction support may be limited to a single data source. Such limitations may restrict the ability of large applications to process complex transactions, which may want to access data stored in a distributed collection of data sources. Supporting transactions in such a setting may be very complicated and may involve the use of a distributed commit protocol.

SUMMARY

A system with transaction support may have a transaction component and one or more data components. The transaction component may manage a transaction's operations using a log sequence number for each operation of the transaction, transmitting an operation to one of several data components. The data components may perform the data operations in an idempotent manner and return a reply. The transaction component may be able to commit a transaction, as well as retry or undo operations of a transaction, even when a single transaction uses multiple data components, which may be located on different devices or manage separate and independent datasources.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A distributed transactional system may have one or more transaction components and several data components. The transaction components may manage transactions that may include operations on several data components. The transaction components may issue monotonically increasing log sequence numbers for operations that may change records or tables or other data, and may log information about the executions of the various operations, some of which may be contained in the replies it receives from data components.

The transactional system may be able to abort a transaction if one of the operations fail, as well as commit the transaction after all operations of the transaction are executed. The system may be able to recover from failures by redoing or undoing various data operations at the data components. The data components may operate in an idempotent manner, so that data operations may be re-processed without adversely affecting correctness by ensuring that any operation is executed exactly once.

The transactional system may enable single transactions to span multiple data components, including data components that may be remotely located, located in the cloud, or locally hosted. In some embodiments, the various data components may be of diverse implementations that may follow a common protocol.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and maybe accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

Figure 1:
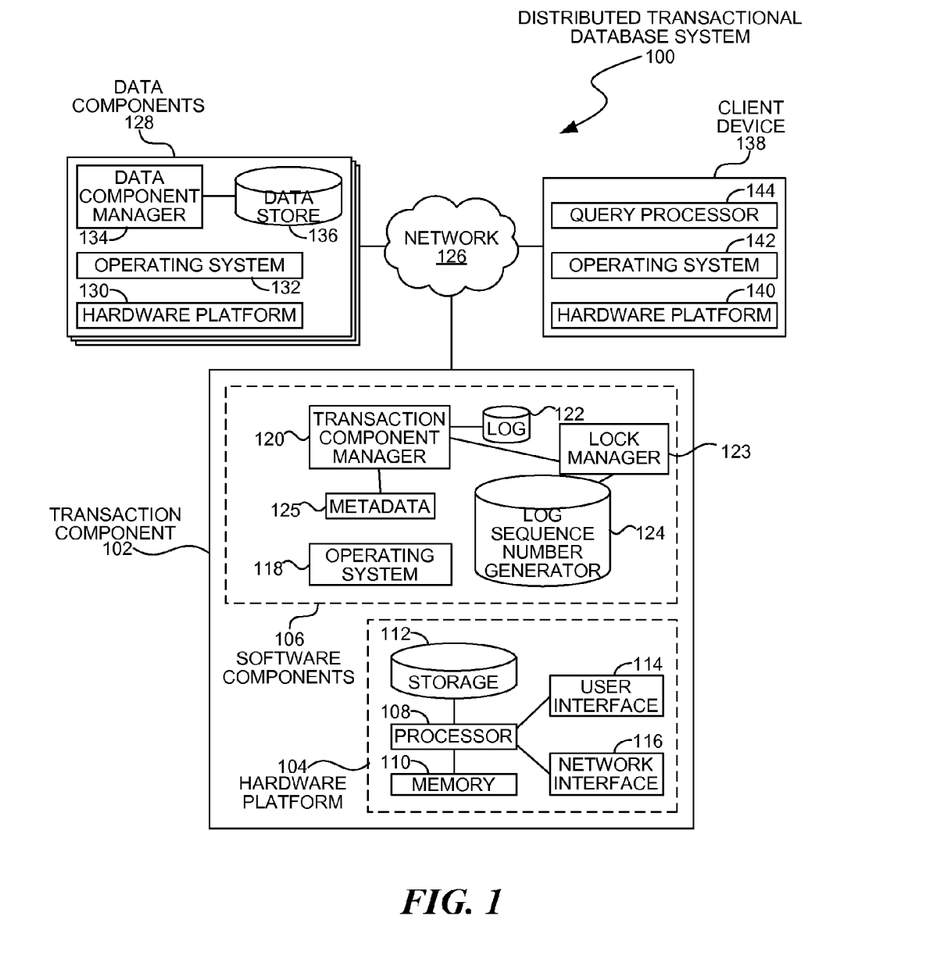
FIG. 1 is a diagram illustration of an embodiment showing a network environment with a distributed transactional system.

FIG. 1 is a diagram of an embodiment 100, showing a distributed transactional system. Embodiment 100 is a simplified example of a network environment in which a transaction component 102 may interact with several data components 128 to perform transactions.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 illustrates a distributed system where several different and independent data components 128 may operate together to perform a transaction. A transaction component 102 may manage the transaction, while the various data components 128 may manage the data operations. The transaction component 102 may ensure the atomicity, consistency, isolation, and durability of the overall transaction. The transaction component 102 may lock various records that may be affected by a transaction, and may keep those records locked until all of the parts of the transaction are completed at which time the transaction may be committed.

The transaction component may manage the transaction, while the data components may be agnostic to the transaction. The data components may process operations in response to the transaction component.

The system may allow data from different locations, different data engines, and other differences to be operated on together to perform a single transaction that may be committed or undone in a single step.

The transaction component 102 is illustrated having hardware components 104 and software components 106. The transaction component 102 as illustrated represents a conventional computing device, although other embodiments may have different configurations, architectures, or components.

In many embodiments, the device 102 may be a server computer. In some embodiments, the device 102 may still also be a desktop computer, laptop computer, netbook computer, tablet or slate computer, wireless handset, cellular telephone, game console or any other type of computing device.

The hardware components 104 may include a processor 108, random access memory 110, and nonvolatile storage 112. The hardware components 104 may also include a user interface 114 and network interface 116. The processor 108 may be made up of several processors or processor cores in some embodiments. The random access memory 110 may be memory that may be readily accessible to and addressable by the processor 108. The nonvolatile storage 112 may be storage that persists after the device 102 is shut down. The nonvolatile storage 112 may be any type of storage device, including hard disk, solid state memory devices, magnetic tape, optical storage, or other type of storage. The nonvolatile storage 112 may be read only or read/write capable.

The user interface devices 114 may be any type of hardware capable of displaying output and receiving input from a user. In many cases, the output displays may be graphical display monitors, although output devices may also include lights and other visual output, audio output, kinetic actuator output, as well as other output devices. Conventional input devices may include keyboards and pointing devices such as a mouse, stylus, trackball, game controller, or other pointing device. Other input devices may include various sensors, including biometric input devices, audio and video input devices, and other sensors.

The network interface 116 may be any type of connection to another computer. In many embodiments, the network interface 116 may be a wired Ethernet connection. Other embodiments may include wired or wireless connections over various communication protocols.

The software components 106 may include an operating system 118 on which various applications and services may operate. An operating system may provide an abstraction layer between executing routines and the hardware components 104, and may include various routines and functions that communicate directly with various hardware components.

The software components 106 may include a transaction component manager 120 that may perform many of the operations to manage transactions. The transaction component manager 120 may receive a transaction from a client device, determine the operations that may be performed to execute the transaction, and may lock various data, and then manage the operations by sending the operations to a data component and receiving replies after the operations are completed. A more detailed view of a transaction component manager 120 may be found in embodiment 200 presented later in this specification.

The transaction component manager 120 may maintain a log 122 that may include replies from operations of a transaction sent to various data components 128 that may have performed the operations. A lock manager 123 may issue log sequence numbers that may be monotonically increasing numbers associated with various operations. The log sequence numbers may be used by the various data components 128 and the transaction component 102 to keep track of the operations on records and tables that may be changed during the process of performing a transaction.

The transaction component 120 may use various metadata 125 that may contain information about all of the available data components 128. The metadata 125 may include information about which records are stored at which data source, information about tables containing the records, and other metadata. The metadata 125 may be stored at one or more of the data components and may be accessed to determine where and how data may be accessed or manipulated.

A data component 128 may operate on a hardware platform 130, which may be similar to the hardware platform 104 of the transaction component 102. A data component 128 may have an operating system 132 which may support a data component manager 134, which may process requests against a data source 136.

The data components 128 may process portions of a transaction as defined by the transaction component 102. The data components 128 may operate in an idempotent manner, meaning that an operation may be submitted multiple times to be performed at a data component 128 but the effect may be the same as if the operation were executed exactly once.

In some embodiments, the data components 128 may operate in an idempotent manner by remembering operations performed by the data component and their log sequence numbers. If an operation has already been performed, the data component 128 may not perform the operation again. The data component manager 134 may evaluate incoming data operations to determine whether or not the operation has been performed and may perform the operation if it has not been performed before.

The data components 128 may manage different collections of data. In some embodiments, the data components 128 may be attached to the transaction component 102 through various connections to a network 126. For example, some of the data components 128 may be available over a local area network, while other data components 128 may be available over the Internet and may be cloud based data components.

In some embodiments, the data components 128 may be different from each other. For example, one data component may operate one type of data source manufactured by one vendor and another data component may operate a second type of data source manufactured by a second vendor.

Data components 128 may be separate and independent, and transactions may be performed over many different data components. Such a capability may enable a wide range of complex and/or widely distributed transactions.

A client device or application 138 may create a transaction that may be processed by the transaction component 102. The client device or application 138 may have a hardware platform 140, and operating system 142, and a query processor 144. The query processor 144 may be any type of application through which a transaction may be generated and transmitted to the transaction component 102 for processing.

Figure 2:
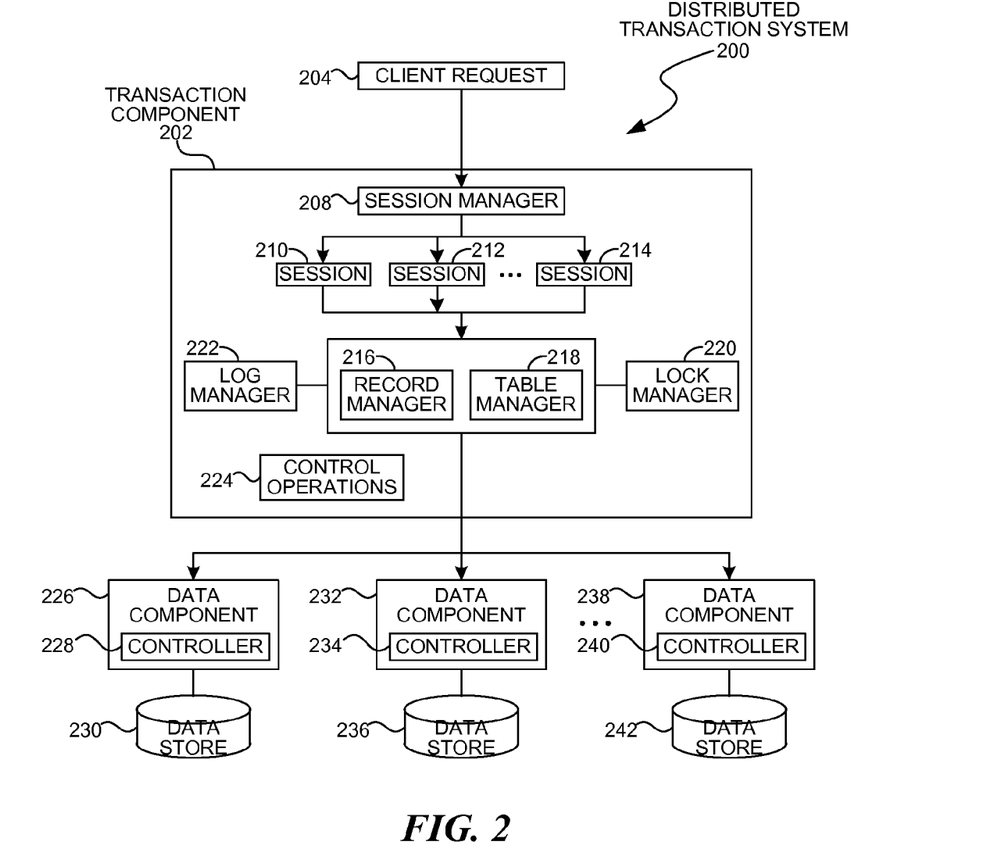
FIG. 2 is a diagram illustration of an embodiment showing a functional view of a distributed transactional system.

FIG. 2 is a diagram of an embodiment 200, showing a schematic view of a distributed transactional system. Embodiment 200 is a simplified example of the components that may make up a distributed transactional system.

The diagram of FIG. 2 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 200 illustrates the components within a distributed transaction system, including some detailed components within a transaction component 202. Embodiment 200 illustrates merely one conceptual architecture of an embodiment that may manage transactions that may be performed over one, two or more data components.

A client request 204 may be passed to a session manager 208, which may create one of several sessions, such as sessions 210, 212, or 214. Each session may be used to track a transaction from start to finish. In many cases, a session may be started by receiving authentication credentials from a client. Such sessions may be independent of other sessions and may allow all of the operations of a single client to be submitted together and performed in sequence.

In some embodiments, a session may be a stream or sequence of operations that a client may request to be performed. In such embodiments, the client may cause a group of operations to be performed as an atomic operation by issuing a "begin transaction command", then a sequence of operations, then an "end transaction" command. In such an embodiment, the operations contained between the transaction commands may be performed in an atomic fashion.

Within each session, a transaction may invoke a record manager 216 or table manager 218. The record manager 216 may handle operations relating to individual records, such as reading, writing, and editing individual records. The table manager 218 may handle operations relating to tables, such as creating, editing, deleting, or other operations relating to tables or other structural elements, including maintaining the metadata describing these elements.

Both the record manager 216 and table manager 218 may create a sequence of data operations, lock records or tables, respectively, cause the operations to be executed, and to release the locks on records or tables when a transaction may be completed.

The record manager 216 or table manager 218 may invoke a lock manager 220 that may lock the various records or tables that may be affected by a transaction.

The lock manager 220 may issue a log sequence number for each data modification operation. The log sequence number may be a monotonically increasing number and may be used to coordinate with the data components, as well as to roll back the system state, or repeat certain operations.

When a data operation is transmitted to a data component, a request for the data operation may include a log sequence number. A data component may perform the operation and remember its log sequence number. After one or more transactions have been completed, a log sequence number called an end of stable log may be transmitted to the various data components. Upon receiving the end of stable log, a data component may make persistent the effects of all operations with log sequence numbers less than or equal to the log sequence number defined in the end of stable log.

A log manager 222 may track all completed data operations along with their associated log sequence number. The log manager 222 may receive an operation and information from the data component reply along with the associated log sequence number and may store this information. When all of the data operation replies are received and a transaction commit record is written to the stable log, the transaction may be committed.

The information collected by the log manager 222 may be used by one of the record manager 216 or the table manager 218 to determine if a data operation has been completed. If the data operation has not been completed, the record manager 216 or table manager 218 may choose to re-send the data operation to a data component or to abort the transaction.

The log manager may compute an end of stable log, which may define the operation with the highest log sequence number whose effects may be made stable. The end of stable log may be passed to the data components on a periodic basis to permit the data components to make stable the operations up to the end of stable log. The log manager ensures that all operations with log sequence numbers less than or equal to the end of stable log LSN are on the stable part of its log and hence will survive a TC crash.

The log manager may also periodically update a redo scan start point. The redo scan start point may be used to redo a set of operations by the data components in the event of a failure of the transaction component and/or the data component. The redo scan start point may be calculated by the log sequence number for which all operations with lower log sequence numbers have been replied and are on the stable log. Further, the data component has promised, when it acknowledges an redo scan start point message, that it has made the effects of all operations with log sequence number less than the redo scan start point log sequence number stable so that their effects will not be lost should the data component crash. In the event of a failure, all of the operations with log sequence numbers greater than the redo scan start point log sequence number may be sent by the transaction component to the data components, some of which may have already been sent and executed. Because the data components operate in an idempotent fashion, the re-sending of the operations may not be detrimental.

The transaction component 202 may manage several data components 226, 232, and 238. Each data component may have a respective cache manager 228, 234, and 240, and may interface with a data source 230, 236, and 242, respectively.

Figure 3:
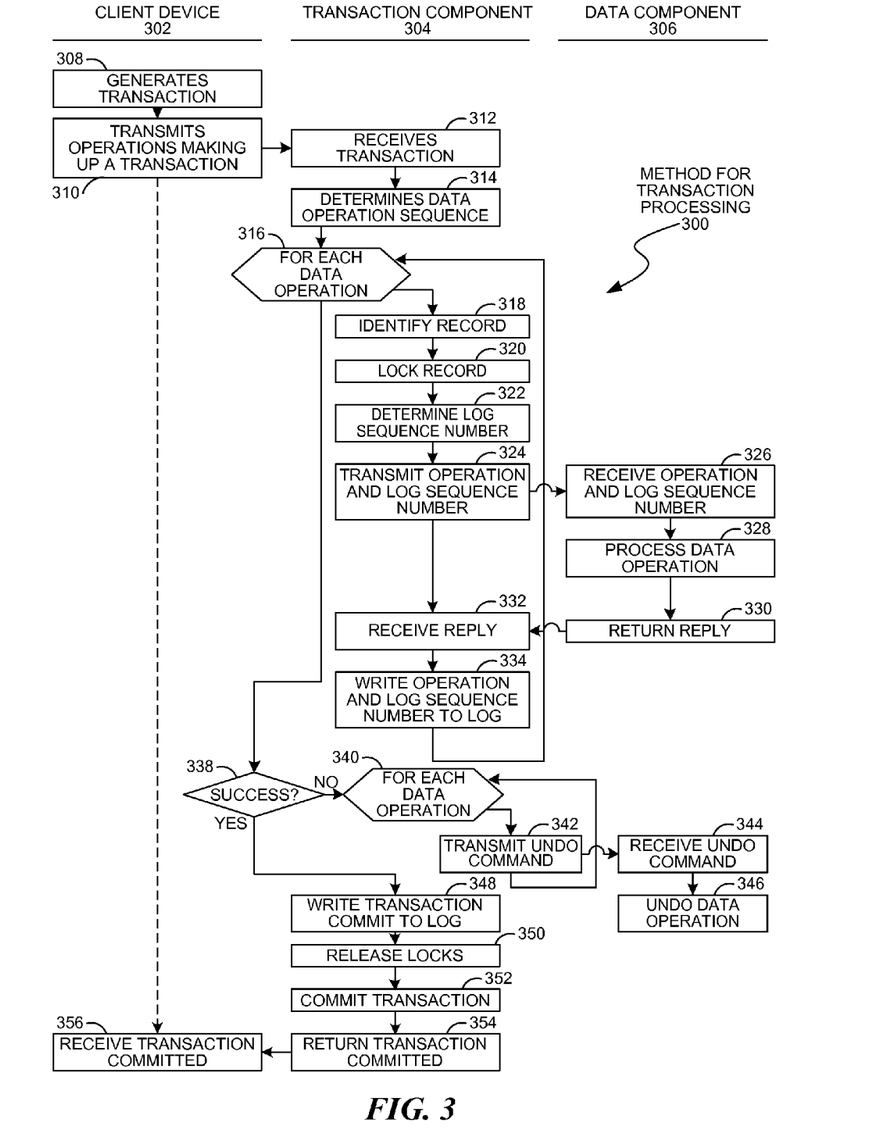
FIG. 3 is a timeline illustration of an embodiment showing a method for transaction processing.

FIG. 3 is a flowchart illustration of an embodiment 300 showing a method for processing a transaction. The operations of a client or application 302 may be found in the left hand column. The operations of a transaction component 304 are in the center column and operations of a data component 306 are in the right hand column.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 is a simplified example of various interactions and steps that may be performed to execute a transaction. Embodiment 300 illustrates some of the operations performed by a transaction component 304, which may manage the transaction separately from the data component 306, which may store and retrieve information from a data store supporting atomic operations.

The transaction component and data component may be separated so that a single transaction may be performed with many data components. In some cases, the data components may be local components that operate on the same device as the transaction components, although in such cases the data components may operate as independent processes. In other cases, the data components may be implemented on separate computer systems, which may be available over a local area network, wide area network, the Internet, or other communications network.

The transaction component may manage all of the transactional aspects, while the data components may manage the interfaces to the data stores. The transactional aspects may include causing all of the operations submitted by the client or application to execute in sequence, and then committing the transaction when all of the operations are complete. If one or more of the operations fails or is not completed, the transaction may be aborted and any previously completed operation may be undone.

The data components may operate in an idempotent manner. Such a property may allow a transaction component to re-send operations to the data components without causing problems with the data components. For example, a transaction component may attempt to recover from a failure by resending operations that it may have logged. Because the data components are idempotent, the transaction component may resend the operations without harm, i.e. with the assurance that the effect will be equivalent to exactly once execution.

A client device 302 may generate a transaction request together with a set of operation requests 308 and transmit them in a group 310 to the transaction component 304, which may receive the group 312. The client device 302 may generate the transaction through an application or other mechanism, and the transaction component 304 may process the requests in response.

In some embodiments, the client may transmit a sequence of data operations to the transaction component. The data operations may be performed on an individual basis or as a transaction made up of several operations. In such embodiments, the client may transmit a "begin transaction" command, followed by the operations that make up the transaction, followed in turn by an "end transaction" command.

The transaction component 306 may add operations to the submitted group of operations in block 314. The data operations may define which data components may process which portions of the group of requests.

For each data operation in block 316, the records that may be affected by the data operations may be identified in block 318 and locked in block 320. A log sequence number may be determined in block 322 for the transaction. The data operation may be transmitted in block 324 to the data component 306, which may receive the data operation in block 326. The process may loop back to block 316 for each data operation to start all of the data operations at the respective data components.

Embodiment 300 illustrates an example where multiple data operations may be performed in parallel by different data components. In some embodiments, some data operations may have dependencies on other operations. In such embodiments, the data operations may be transmitted in series, with the output of one data operation may be passed to later data operations.

The data components 306 may process the data operations in block 328 and return a reply in block 330.

The reply may be received in block 332 and the operation, information from the reply, and log sequence number may be written to a log in block 334. The reply may include all of the information that may be used to undo or redo the operation. Such information may include the state of any affected records prior to the operation, the operation definition, and any other information. In the event of a failure of the transaction component, the log may be used to redo various operations. In the event that a transaction fails, the log may be used to identify a series of operations that may undo any previously completed operations.

The operations of blocks 332 through 334 may be performed out of sequence with the log sequence numbers of the operations. Such may be the case when multiple data operations may be performed from different transactions in different sessions by one or several data components. Because operation replies from one or more data components may be received in an order that differs from their log sequence number, additional work is required in the log manager to deal with this.

The operations of blocks 316 through 334 may illustrate an embodiment where the data operations are performed in sequence. In such an embodiment, the results of a first operation may be the input to a second data operation. Such embodiments may operate by performing the first operation to completion, then performing the second operation. Other embodiments may have two or more operations performed in parallel.

In some embodiments, the transaction component 304 may detect that a data component has not returned a reply and may re-send the data operation. Such a response may operate well when the data component may be idempotent, as a communication interruption or other cause of the reply delay or failure may result in the data operation being sent multiple times to the data component. Because the data component is idempotent, the data component may not be adversely affected by receiving multiple data operation requests for the same operation.

When all of the data operations have successfully completed and the transaction is complete in block 338, a transaction commit record may be written to the log in block 348. The locks on the locked records may be released in block 350, and the transaction may be committed in block 352. In some embodiments, the commit operation in block 352 may be performed after the log records of operations of the transaction and its commit log record have become stable. Once the transaction is complete, a "committed reply" may be transmitted in block 354 and received by the client device 302 in block 356.

If the transaction fails in block 338 because one or more of the data operations fails or for some other reason, the transaction may be undone. In block 340, each data operation may be processed. For each data operation in block 340, the an undo command may be transmitted in block 342 and received in block 344 by the data component 306, which may undo data operations in block 346.

In many embodiments, the undo commands may be transmitted to the data components in reverse log sequence order. The undo commands may be commands that are the inverse of the original operations and may be performed by reading the log to find operations to be undone, determining a new log sequence number for the undo operation, transmitting the operations to the data component, and logging the undo operations, based on the replies, to the log. After the undo operations are completed, an abort reply may be transmitted to the client 302.

Figure 4:
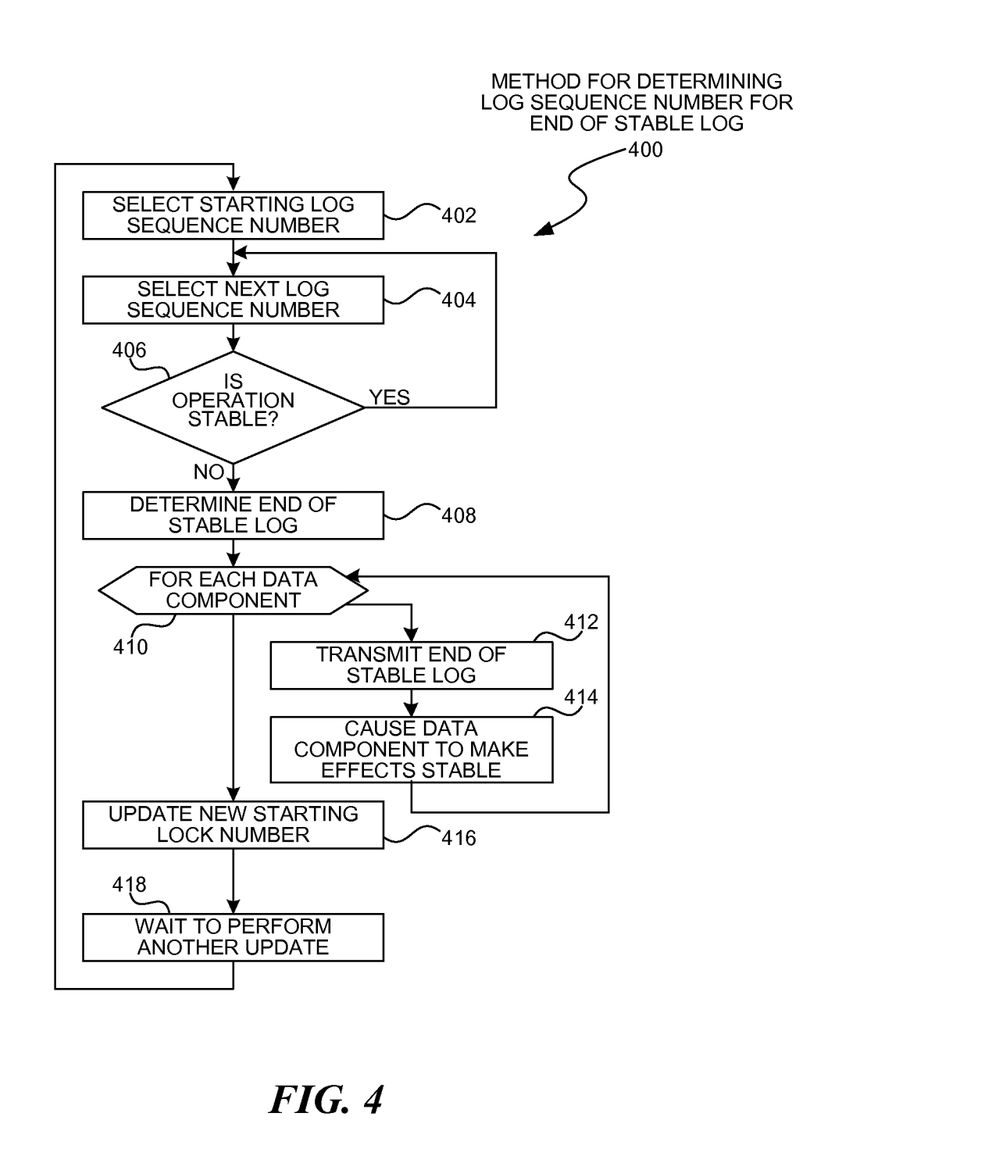
FIG. 4 is a flowchart illustration of an embodiment showing a method for determining the log sequence number that may serve as an end of stable log log sequence number sent to the data component.

FIG. 4 is a flowchart illustration of an embodiment 400 showing a method used by a transactional component for determining log sequence number to send to a data component to enable the data component to make the effects of operations that it has received from the transaction component stable.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 illustrates some mechanisms that enable a transaction component to compute a log sequence number, called the "end of stable log", for which all operations with lower log sequence numbers have been recorded on the part of the log that is stable and will persist across system crashes. A starting log sequence number may be selected in block 402.

The starting log sequence number may be the point at which a previous operation of embodiment 400 has completed, i.e. the prior end of stable log.

The next log sequence number may be selected in block 404. If the operation has had its log record made stable, which is tested in block 406, the process may return to block 404 to increment the log sequence number. When the operation scanned in this loop has not been made stable as tested in block 406, an end of stable log may be identified in block 408 as the immediately prior log sequence number. The end of stable log may be a log sequence number for which all of the data operations with equal or lower log sequence number have been made stable.

For each data component in block 410, the end of stable log may be transmitted in block 412. Since the log sequence numbers may be monotonically incremented by the transaction component but the data operations may be processed by different data components, the end of stable log sequence number may refer to a log sequence number that may or may not have been processed by a specific data component.

The data component may use the end of stable log to make stable some or all data operations with log sequence numbers at or lower than the end of stable log.

After updating the data components, a new starting log sequence number may be determined in block 416. The process may wait at block 418 to perform another update, then return to block 402. In some instances, another update may be performed after a timeout occurs, when another update or predefined number of updates are performed, or due to some other criteria.

Figure 5:
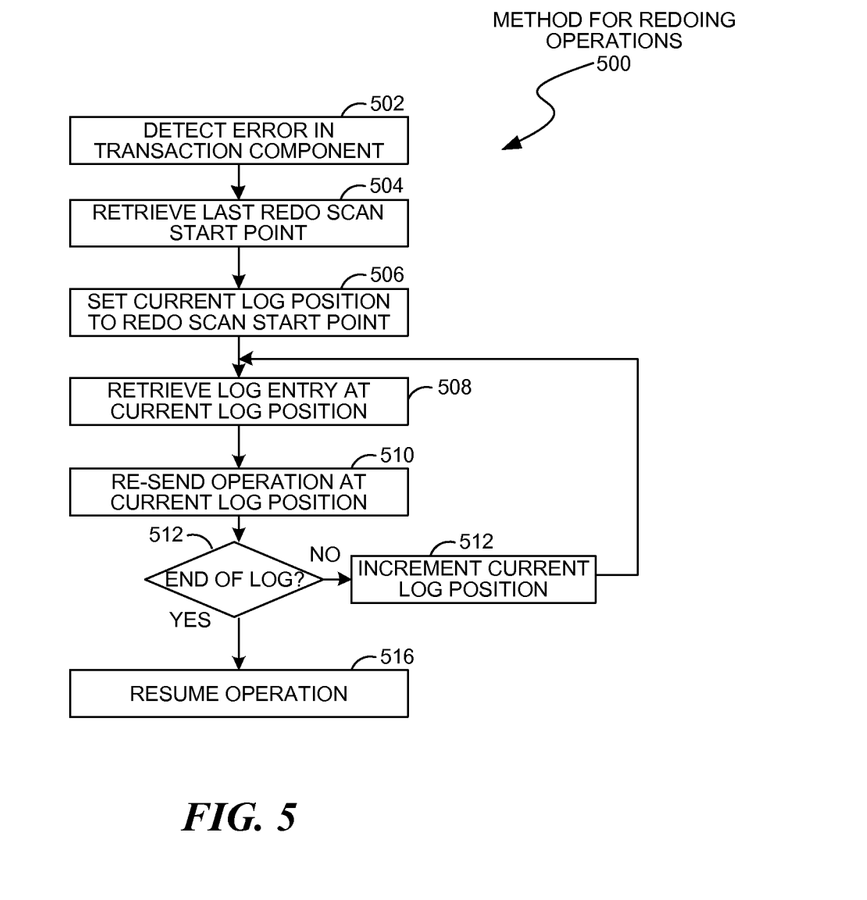
FIG. 5 is a flowchart illustration of an embodiment showing a method for performing redo recovery.

FIG. 5 is a flowchart illustration of an embodiment 500 showing a method for redoing operations.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 500 illustrates a method that may be performed to recover from an error with a transaction component. The error may cause the transaction component to be restarted, which may lose any information that has not been saved. In order to effectively resume, a redo scan start point may be used to begin recovery from a log. The log may contain entries that are complete enough so that the recovery operation may re-send the operations to a data component. Because the data component operates in an idempotent manner, the commands may be resent and the same result may be achieved as when the command was sent the first time.

In block 502, an error may be detected in the transaction component and the transaction component may be restarted. In block 504, a last redo scan start point may be retrieved. The current log position may be set to the redo scan start point log position in block 506.

The log entry at the current log position may be retrieved in block 508 and the operation corresponding to the log entry may be re-sent in block 510. If the end of the log has not been reached in block 512, the current log position may be incremented in block 514 and the process may loop back to block 508. When the end of log may be reached in block 512, normal operation may resume in block 516.

In some embodiments, the end of stable log used in embodiment 400 may permit data components to make the effects of operations stable. In practice, a data component may take some time to actually write the operation effects to stable storage, however it can promptly transmit a reply indicating that it has received the end of stable log message and may manage its cache accordingly.

In many cases, the data components may make the effects of operations persistent according to a data component cache management policy. Such embodiments may ensure that operations with log sequence numbers greater than the end of stable log may not be written to stable storage until another end of stable log message may be received. An end of stable log message may permit the data component and the transaction component to jointly enforce a write ahead log protocol that may ensure that all operations captured in the state maintained by the data component are also in the log maintained by the transaction component.

The transaction component may coordinate redo recovery with the data component. In order for the redo recovery to operate effectively, the data component may have made permanent all the effects of any operations earlier than the redo scan start point. This may be so that the operations may not have to be re-executed during recovery. The redo scan start point may be the point in the log at which the transaction component may start resending operations to the data component during recovery. If an operation is earlier than the redo scan start point, the operation might not be re-sent and may be lost if not already made permanent by the data component.

The transaction component may associate a log sequence number that it selects to send to the data component as the redo scan start point, and store both this log sequence number and a log position on its log. Operations earlier on the log than that the log position might not be sent to a data component after a failure. Thus, these operations may have only log sequence numbers that are less than the redo scan start point sent to the data components. Further, the data component may have made stable the effects of all operations with log sequence numbers less than the redo scan start point, so that those operations are not re-executed during recovery.

Because operations may not be written to the log in log sequence number order, the transaction component may ensure that no operations earlier on the log than the log position associated with the redo scan start point have log sequence numbers greater than the log sequence number associated with the redo scan start point. To do this, the transaction component may keep track of the largest log sequence number that has been recorded when computing an end of stable log log sequence number. The end of stable log may compute the highest value for a log sequence number such that operations with log sequence numbers less than the end of stable log are on the stable log. The transaction component may store the log position that is the end of the stable log. For each of a series of end of stable log messages the transaction component sends to the data component, the transaction component may store the end of stable log log sequence number, the log position of the end of the stable log, and the highest log sequence number that has so far been written to the stable log.

When the transaction component may compute a redo scan start point, the transaction component may find an end of stable log whose log sequence number may be greater than the highest log sequence number recorded for an earlier end of stable log. This value can serve as a redo scan start point to be sent to the data component and can be paired with the log position of the earlier end of stable log. What the transaction component knows from this is that this redo scan start point log sequence number may be greater than the log sequence number of all operations earlier on the log than the log position identified with the earlier end of stable log information.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method comprising:
receiving a transaction from a client device, the transaction including a sequence of data operations for a plurality of data components;
adding one or more data operations to the transaction;
for each of the data operations:
identifying one or more records associated with the data operation;
locking the one or more identified records;
identifying one of the plurality of data components to process the data operation;
transmitting the data operation to the identified data component;
receiving a reply from the identified data component, the reply including information used to undo or redo the data operation; and
writing the data operation and the information from the reply to a log;
after receiving replies for each data operation, determining whether each data operation has been made stable;
transmitting a command to each of the plurality of data components to indicate that the data operations are permitted to be written to stable storage when it has been determined that each of the data operations have been made stable;
writing a transaction commit record to the log;
releasing any locks on the identified records;
committing the transaction after each of the data operations of the transaction and the commit record have been determined to be stable; and
transmitting a committed transaction reply to the client device to indicate that the transaction has been committed.

2. The method of claim 1, further comprising establishing an authenticated session with the client device prior to receiving the transaction.

3. The method of claim 1, wherein at least one of the data operations is a write operation.

4. The method of claim 1, further comprising detecting a failure with one of the data operations and causing the identified data component to undo at least one of the previous data operations.

5. The method of claim 1, further comprising determining that one of the data operations may not have been completed and resending that data operation to the identified data component.

6. The method of claim 5, wherein determining that one of the data operations may not have been completed comprises failing to receive a reply from the identified data component.

7. The method of claim 5, wherein the resent data operation already completed prior to the resending and the identified data component performed the data operation in an idempotent manner.

8. The method of claim 1, wherein at least one of the data operations is an add operation.

9. A system comprising:
at least one data component comprising:
a processor;
a storage system; and
a data component manager that:
receives data operation requests comprising data operations;
processes the data operation requests; and
returns a reply;
at least one transaction component comprising:
a processor; and
a transaction component manager that:
receives a transaction from a client device, the transaction including a sequence of data operations;
adds one or more data operations to the transaction;
for each of the data operations:
identifies one or more records associated with the data operation;
locks the one or more identified records;
transmits a data operation request comprising the data operation to the data component;
receives a reply from the data component, the reply including information used to undo or redo the data operation; and
writes the data operation and the information from the reply to a log;
after receiving replies for each data operation, determines whether each data operation has been made stable;
transmits a command to the data component to indicate that the data operations are permitted to be written to stable storage when it has been determined that each of the data operations have been made stable;
writes a transaction commit record to the log;
releases any locks on the identified records;
commits the transaction after the data operations of the transaction and the commit record have been determined to be stable; and
transmits a committed transaction reply to the client device to indicate that the transaction has been committed.

10. The system of claim 9, wherein the transaction component manager further detects a failure with one of the data operation requests and causes the data component to undo at least one of the previous data operation requests.

11. The system of claim 9, wherein the transaction component manager fails to receive a reply for one of the data operation requests and resends that data operation request to the data component.

12. The system of claim 11, wherein the data operation corresponding to the resent data operation request already completed before the request is resent and the data component performed the data operation in an idempotent manner.

13. The system of claim 9, further comprising a session manager to establish an authenticated session with the client device prior to receiving the transaction from the client device.

14. The system of claim 9, wherein at least one of the data operations is a write operation.

15. A system comprising:
a transaction component comprising:
a processor;
a session manager configured to operate on the processor, the session manager that establishes an authenticated session with a client device; and
a transaction component manager that:
receives from the client device a transaction having a plurality of data operations, each data operation to be performed on one of a plurality of data components;
adds one or more data operations to the transaction;
for each of the data operations:
identifies one or more records associated with the data operation;
locks the one or more identified records;
identifies one of the plurality of data components to process the data operation;
transmits the data operation to the identified data component;
receives a reply from the identified data component, the reply including information used to undo or redo the data operation; and
writes the data operation and the information from the reply to a log;
after receiving replies for each data operation, determines whether each data operation has been made stable;
transmits a command to the plurality of data components to indicate that the data operations are permitted to be written to stable storage when it has been determined that each of the data operations have been made stable;
writes a transaction commit record to the log;
releases any locks on the identified records;
commits the transaction after the data operations of the transaction and the
commit record have been determined to be stable; and
transmits a committed transaction reply to the client device to indicate that the transaction has been committed.

16. The system of claim 15, wherein the transaction component manager further detects a failure with one of the data operation requests and causes the identified data component to undo at least one of the previous data operation requests.

17. The system of claim 15, wherein the transaction component manager fails to receive a reply for one of the data operation requests and resends that data operation request to the identified data component.

18. The system of claim 17, wherein the data operation corresponding to the resent data operation request already completed before the request is resent and the identified data component performed the data operation in an idempotent manner.

19. The system of claim 15, wherein at least one of the data operations is a write operation.

20. The system of claim 15, wherein at least one of the data operations is a delete operation.

* * * * *